(12) United States Patent
Otaka et al.

(10) Patent No.: US 7,797,567 B2
(45) Date of Patent: Sep. 14, 2010

(54) STORAGE APPARATUS, AND METHOD FOR PERFORMING FAULT RECOVERY OF STORAGE APPARATUS

(75) Inventors: Atsuhiro Otaka, Kawasaki (JP); Daiya Nakamura, Kawasaki (JP); Omar Thielo, Kawasaki (JP); Nobuyuki Honjo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 11/508,913

(22) Filed: Aug. 24, 2006

(65) Prior Publication Data

US 2007/0253232 A1 Nov. 1, 2007

(30) Foreign Application Priority Data

Apr. 28, 2006 (JP) .............................. 2006-124585

(51) Int. Cl.
*G06F 11/00* (2006.01)
(52) U.S. Cl. .................................. 714/4; 714/5; 714/43
(58) Field of Classification Search ..................... 714/4, 714/5, 43
See application file for complete search history.

(56) References Cited

U.S. PATENT DOCUMENTS

| | | | | |
|---|---|---|---|---|
| 7,003,567 | B2 * | 2/2006 | Suzuki et al. ................ | 709/224 |
| 7,127,633 | B1 * | 10/2006 | Olson et al. ...................... | 714/4 |
| 7,178,059 | B2 * | 2/2007 | Greenspan et al. ............. | 714/13 |
| 7,216,264 | B1 * | 5/2007 | Glade et al. ..................... | 714/48 |
| 7,340,636 | B2 * | 3/2008 | Murakami et al. .............. | 714/4 |
| 7,467,235 | B2 * | 12/2008 | Kameda ...................... | 709/250 |
| 2003/0018927 | A1 * | 1/2003 | Gadir et al. ..................... | 714/4 |
| 2003/0037275 | A1 * | 2/2003 | Bakke et al. .................... | 714/4 |
| 2004/0123027 | A1 * | 6/2004 | Workman et al. ........... | 711/112 |
| 2005/0050401 | A1 | 3/2005 | Matsuki et al. | |
| 2005/0188243 | A1 * | 8/2005 | Adams et al. .................. | 714/4 |
| 2006/0117212 | A1 * | 6/2006 | Meyer et al. ................... | 714/4 |

FOREIGN PATENT DOCUMENTS

| | | |
|---|---|---|
| JP | 2000-207294 | 7/2000 |
| JP | 2003-316671 | 11/2003 |
| JP | 2004-005727 | 1/2004 |
| JP | 2005-71196 | 3/2005 |

OTHER PUBLICATIONS

Japanese Patent Office Action, mailed Apr. 15, 2008 and issued in corresponding Japanese Patent Application No. 2006-124585.
Decision of Refusal from Japanese Patent Office for corresponding Japanese Application 2006-124585; mailed Jul. 22, 2008.

* cited by examiner

*Primary Examiner*—Yolanda L Wilson
(74) *Attorney, Agent, or Firm*—Staas & Halsey LLP (57) ABSTRACT

The storage apparatus includes a plurality of storage devices for storing information, a control unit controlling the storage device, a switching unit switching a connection between the storage device and the control unit, and a network different from the connection by the switching unit and connecting the storage device and the control unit. Reading of information from the storage device and writing of information into the storage device is performed by the control unit through the switching unit, and when a fault occurs in the storage device, a fault recovery command is sent from the control unit through the network to the corresponding storage device or the switching unit.

7 Claims, 6 Drawing Sheets

STORAGE APPARATUS, AND METHOD FOR PERFORMING FAULT RECOVERY OF STORAGE APPARATUS

CROSS-REFERENCE TO RELATED APPLICATIONS

This application claims the conventional priority based on Japanese Application No. 2006-124585, filed on Apr. 28, 2006, the disclosures of which are incorporated herein by reference.

BACKGROUND OF THE INVENTION

1. Field of the Invention

The present invention generally relates to a storage apparatus and a method for performing fault recovery of the storage apparatus which enable to reduce a load on a fibre channel (FC) and perform a recovery rapidly in a case of a route anomaly by means of another network (such as Ethernet (registered trademark) or the like) without using an interface (I/F) of the fibre channel which is a function of the fibre channel in the storage apparatus.

2. Description of the Related Art

Conventionally, in a fabric connection, when some sort of anomaly occurs in a loop at the side of a device enclosure (DE), and a control module (CM) issues a LIP (Loop Initialization Primitive) to recover the loop (initialize the loop), it is necessary to send a command for issuing the LIP, to a fibre channel switch (FC-SW) via a fibre channel from the control module.

Moreover, when the control module cancels the command issued to a hard disk (HDD) in the device enclosure due to some sort of reason, it is necessary to issue the command to the HDD, or issue the LIP to the loop of the HDD. However, when a fibre channel connection between the control module and the fibre channel switch is disconnected and the command cannot be sent, it is not possible to recover the loop which has become abnormal.

When the above described state has been occurred, conventionally there is only methods in which another control module detects the loop anomaly and sends the command of issuing the LIP, or a communication between the control module and the control module (CM-CM communication) is used to request another control module to send the command of issuing the LIP.

Figure 6:
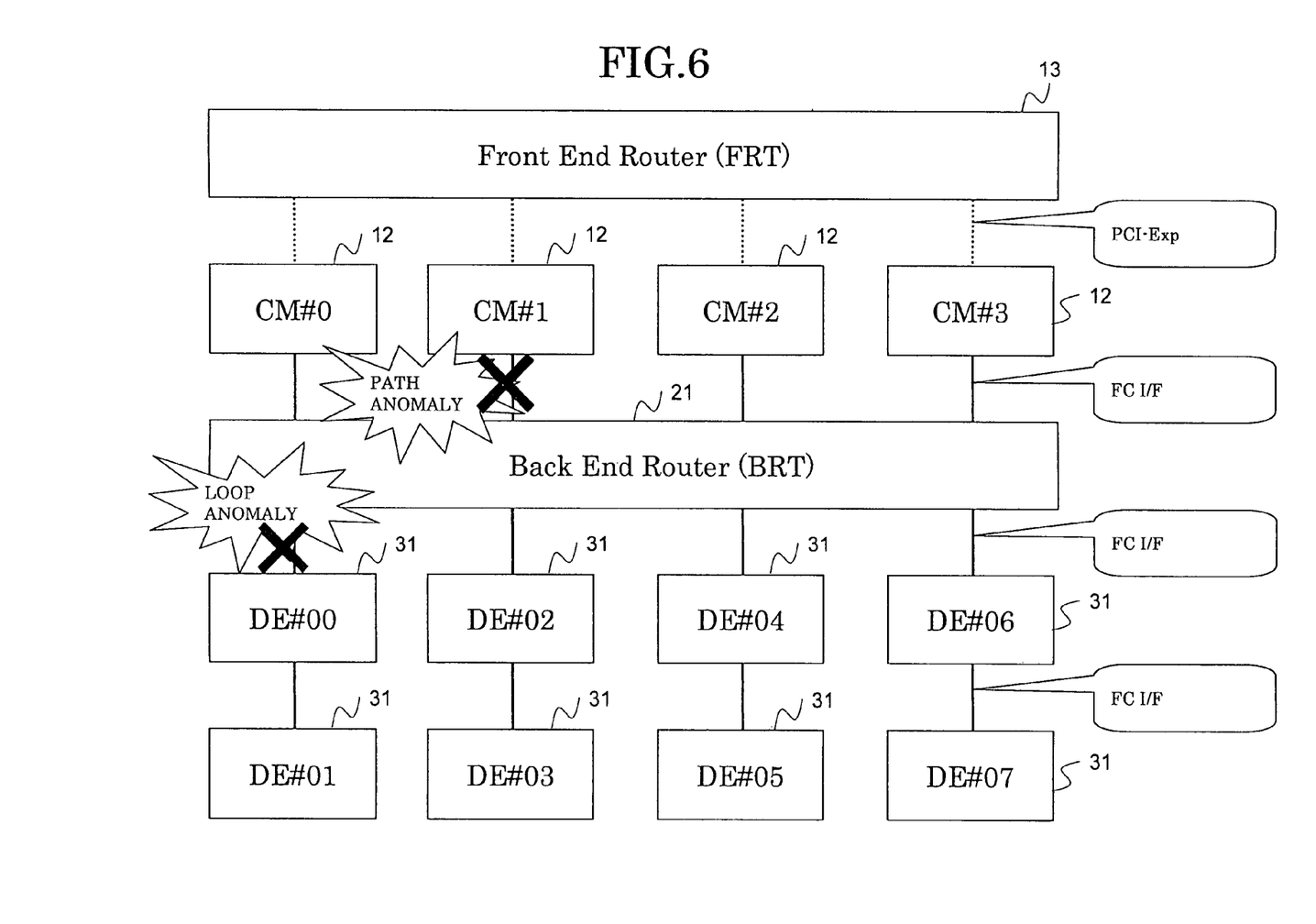
FIG. 6 is an explanatory diagram of a conventional example.

FIG. 6 is an explanatory diagram of a conventional example. In FIG. 6, a storage apparatus includes control modules (CM#0-CM#3) 12, a front end router (FRT) 13, a back end router (BRT) 21, and device enclosures (DE#00-DE#07) 31 are provided. Here, by way of example, the figure shows the case where the anomaly (loop anomaly) has occurred in the loop at the side of the device enclosures 31 #00 and #01 and the fibre channel switch (here, the back end router 21), and the case where the fibre channel connection between the control module 12 #1 and the fibre channel switch (here, the back end router 21) has been disconnected (path anomaly). It should be noted that the side of the device enclosures 31 (#00 and #01) is connected in a loop via a FC interface (FC I/F). The communication between the control module and the control module (CM-CM communication) is performed using the front end router 13.

Additionally, there has been a conventional disk array device which reads information on a fault from a memory device and transfers the information to a management terminal to manage the fault information efficiently (refer to Japanese Patent Laid-Open No. 2005-71196). However, this disk array device only obtains the fault information, and the issuing of the LIP has not been described therein.

The above-described conventional techniques have problems as follows.

When another control module detects the loop anomaly and sends the command of issuing the LIP, it takes time for another control module 12 to detect the loop anomaly. Additionally, when another control module 12 is not accessing the loop, another control module 12 cannot detect the anomaly and issue the LIP.

When the communication between the control module and the control module (CM-CM communication) is used to request another control module to send the command of issuing the LIP, a process becomes complex in which it is necessary to confirm which control module 12 is connected to the loop, whether the connection between the control module 12 and the fibre channel switch is not disconnected, and the like. Additionally, when the request for issuing the LIP is sent to all of the control modules 12, a load is imposed on a fabric (here, the back end router 21) by issuing the LIP in a multiple fashion, which may become a cause of delay in other processes.

SUMMARY OF THE INVENTION

It is an object of the present invention to provide a storage apparatus which solves a loop anomaly rapidly via a supervisor control unit connected by another network which is different from a route for reading and writing data, avoids the need to exchange information on other control modules to simplify a process, and even if the loop anomaly is detected by a plurality of control modules simultaneously, reduces a number of issuing a LIP to suppress an increase in FC traffic (a load on a BRT).

It is another object of the present invention to provide a method for performing fault recovery of the storage apparatus for solving a loop anomaly rapidly via a supervisor control unit connected by another network which is different from a route for reading and writing data, avoiding the need to exchange information on other control modules to simplify a process, and even if the loop anomaly is detected by a plurality of control modules simultaneously, reducing a number of issuing a LIP to suppress an increase in FC traffic (a load on a BRT).

The storage apparatus of the present invention comprises a plurality of storage devices storing information, a control unit controlling the storage devices, a switching unit switching a connection between the plurality of storage devices and the control unit, and a network different from the connection by the switching unit and connecting the storage devices and the control unit. The control unit reads information from the storage devices and writes information into the storage devices through the switching unit, and when a fault occurs in a storage device, the control unit sends a fault recovery command to the storage device or the switching unit through the network.

Preferably, when the storage device or the switching unit receives a plurality of same fault recovery commands simultaneously, the storage device or the switching unit integrates fault recovery processes at one time.

Preferably, the control unit obtains information on the storage device through the network.

The method for performing fault recovery of a storage apparatus of the present invention is the method for performing fault recovery of a storage apparatus including a plurality of storage devices storing information, a control unit controlling the storage devices, a switching unit switching a connection between the plurality of storage devices and the control unit, and a network different from the connection by the switching unit and connecting the storage devices and the control unit. The method comprises reading, in the control unit, information from the storage devices and writing information into the storage devices through the switching unit, sending a fault recovery command from the control unit to a storage device or the switching unit through the network when a fault occurs in the storage device.

According to the present invention, there are advantages as follows.

The reading of the information from the storage device and writing of the information into the storage device is performed by the control unit through the switching unit, and when the fault occurs in the storage device, the fault recovery command is sent from the above described control unit through a network to the corresponding storage device or the above described switching unit. Therefore, even if there is the fault in the connection between the control unit and the switching unit, it is possible to resolve the anomaly (fault recovery) rapidly by the different network such as the Ethernet and so on.

When the plurality of same fault recovery commands are received at the storage device or the switching unit simultaneously, the fault recovery processes are integrated at one time. Therefore, it is possible to suppress the increase in the loads on the storage device or the switching unit (the load on the BRT).

Since the control unit obtains the information on the storage device through the network, it is possible to reduce the load on the switching unit.

DETAILED DESCRIPTION OF THE PREFERRED EMBODIMENTS

Figure 2:
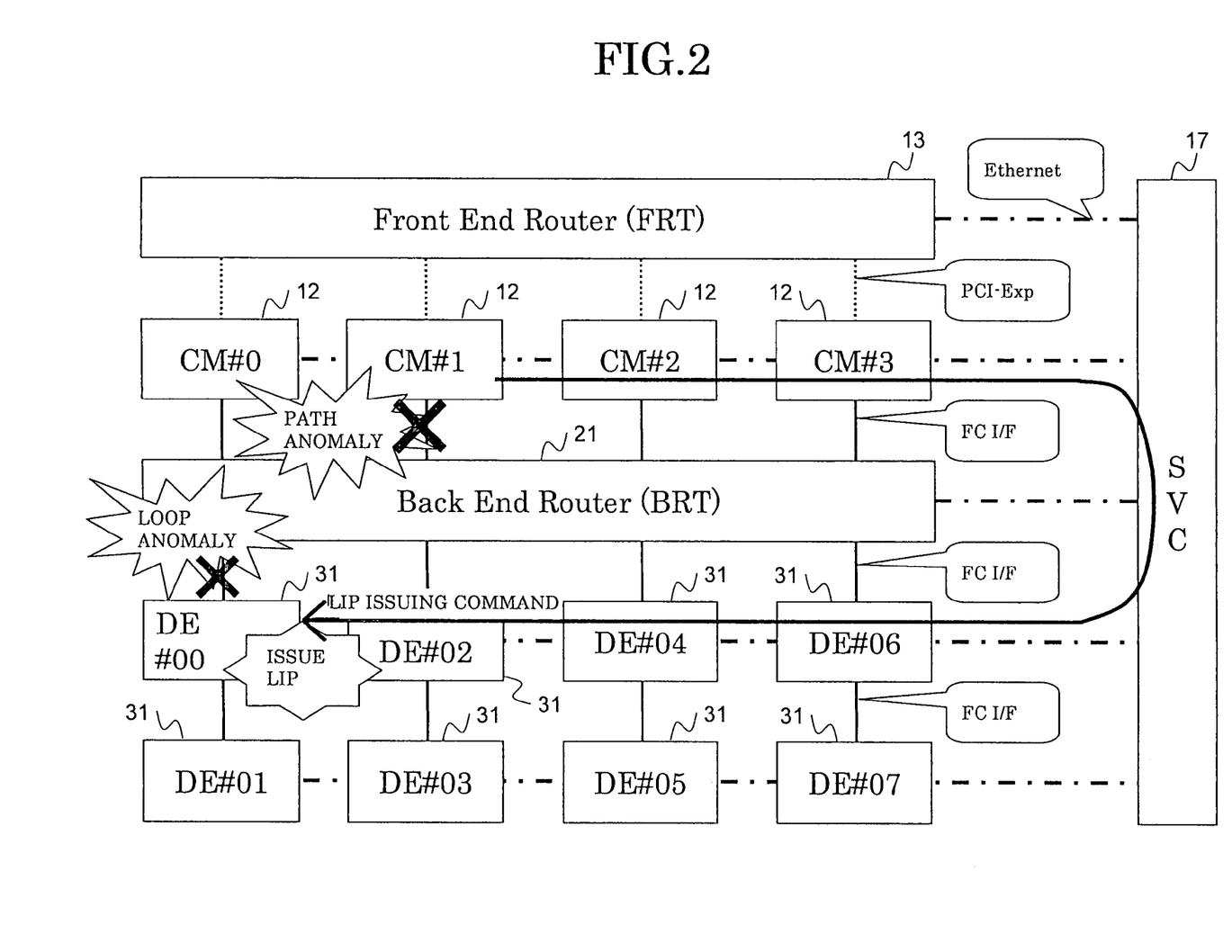
FIG. 2 is an explanatory diagram of a fault recovery process using a supervisor control unit connected by Ethernet of the present invention.

FIG. 2 is an explanatory diagram of a fault recovery process using a supervisor control unit connected by Ethernet of the present invention. In FIG. 2, reference numeral 12 denotes the control modules (CMs) (control units), reference numeral 13 denotes a front end router (FRT), reference numeral 17 denotes the supervisor control unit (SVC), reference numeral 21 denotes a back end router (BRT) (switching unit), and reference numeral 31 denotes device enclosures (DEs) (storage devices).

The storage apparatus of the present invention is configured as follows.

The storage apparatus of the present invention includes a plurality of storage devices 31 storing information, a control unit 12 controlling the storage device 31, a switching unit 21 switching a connection between the plurality of storage devices 31 and the control unit 12, and a network different from the connection by the switching unit 21, and connecting the storage device 31 and the control unit 12. The control unit 12 reads the information from the storage device 31 and writes the information into the storage device 31 through the switching unit 21, and when a fault occurs in the storage device 31, a fault recovery command is sent from the control unit 12 through the network to the corresponding storage device 31 or the switching unit 21. Therefore, even if there is the fault in the connection between the control unit and the switching unit, it is possible to resolve the anomaly (fault recovery) rapidly with the different network such as the Ethernet (registered trademark) and so on.

Preferably, when the storage device 31 or the switching unit 21 receives a plurality of same fault recovery commands simultaneously, the storage device 31 or the switching unit 21 integrates fault recovery processes at one time. Therefore, it is possible to suppress the increase in loads on the storage device or the switching unit (the load on the BRT).

Preferably, the control unit 12 obtains the information on the storage device 31 through the network. Therefore, it is possible to reduce the load on the switching unit.

Hereinafter, the storage apparatus of the present invention is described in detail. A storage apparatus of the present invention, which is a next RAID (Redundant Arrays of Inexpensive Disks) device, can construct a fabric topology by means of a fibre channel switch (hereinafter referred to as FC-SW) function with a back end router (hereinafter referred to as BRT). The storage apparatus performs a fabric connection by connecting the BRT between a CM, which is a control module, and a DE, which is a device enclosure (between CM-DE), as follows. It should be noted that a FC (fibre channel) denotes that it is a fibre channel protocol.

Figure 1:
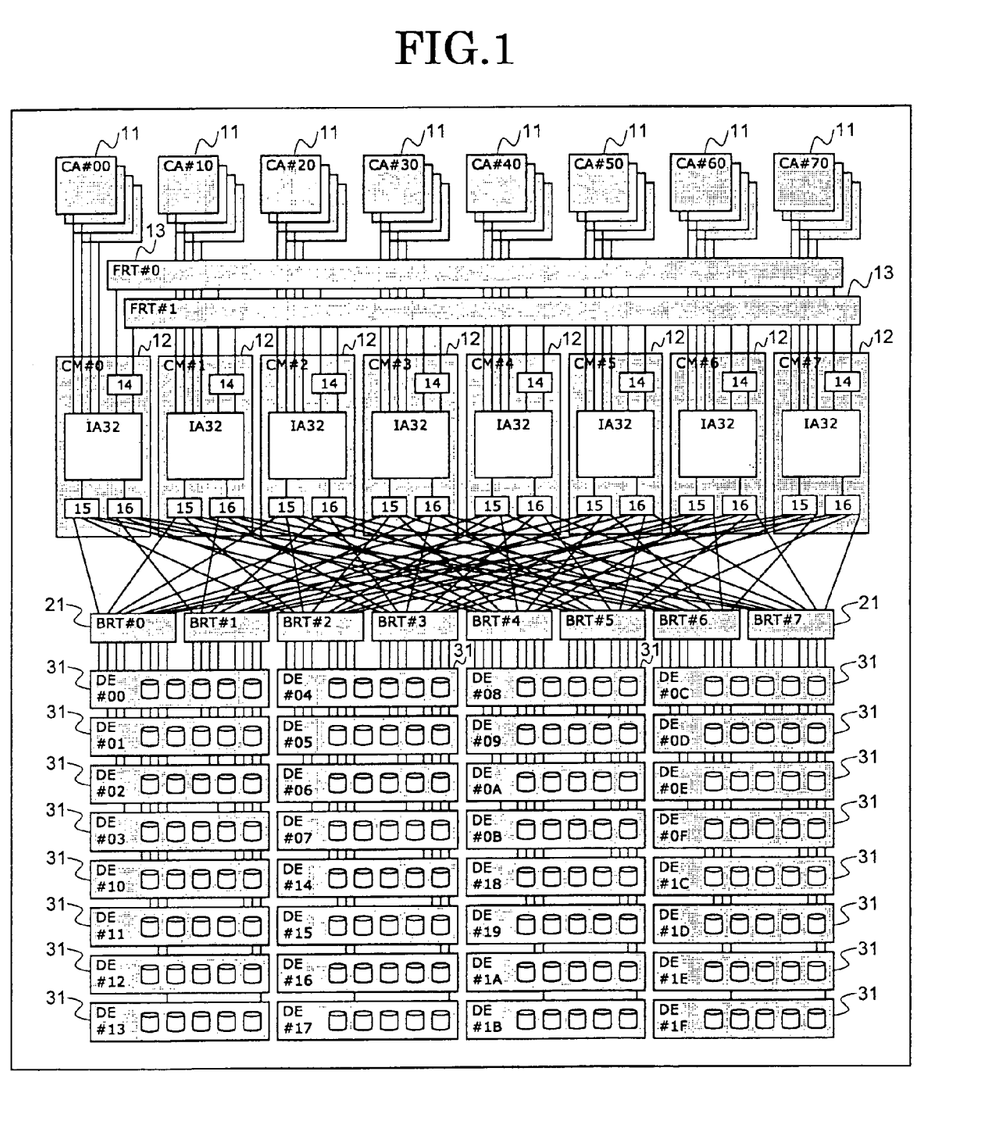
FIG. 1 is an explanatory diagram of a storage apparatus of the present invention.

FIG. 1 is an explanatory diagram of the storage apparatus, showing a system overview of the storage apparatus. The storage apparatus is connected with a plurality of hosts (host computers), configuring a disk array.

In FIG. 1, the storage apparatus includes channel adapters (CA#00-CA#70) 11, control modules (CM#0-CM#7) 12, front end routers (FRT#0 and FRT#1) 13, back end routers (BRT#0-BRT#7) 21, and device enclosures (DE#00-DE#1F) 31. The control modules (CM#0-CM#7) 12 includes a connecting unit 14, FC chips 15 and 16, and a motherboard IA 32.

The channel adapter 11 includes a port connected with the host. Here, for each channel adapter, there are four cards of the channel adapter connected with the host, and one card has two or four ports. It should be noted that a number next to # is in hexadecimal. The control module 12 includes a memory, a CPU and so on, and the control module 12 is a disk (file) control unit understanding a protocol of SCSI from the host and controlling which disk to write in, and construction of the RAID (management of pairs of the RAID) is also performed by the control module 12. The connecting unit 14 is a bridge for connecting with the front end routers (FRT#0 and FRT#1) 13. The FC chips 15 and 16 have four ports for each chip, and are adapters for connecting with the back end routers (BRT#0-BRT#7) 21. The motherboard IA 32 becomes a control unit of the control module 12 provided with the memory, the CPU and so on.

The front end router 13 controls connections among the control modules 12, and two front end routers FRT#0 and FRT#1 are provided. The back end router 21 controls FC connections between the control modules 12 and the device enclosures 31, and eight back end routers BRT#0-BRT#7 are provided. The device enclosure 31 includes a plurality of hard disks (HDDs) to store information, and 32 device enclosures DE#00-DE#1F are provided here.

Moreover, although not shown in FIG. 1, Ethernet, which is a bus type LAN, connects between the control modules 12 and the back end routers 21 (between CM-BRT) and between the control modules 12 and the device enclosures 31 (between CM-DE), via a supervisor control unit (SVC), and it is possible to communicate with one another.

In a writing operation of the storage apparatus, the channel adapter 11 receives a writing request from the host, and sends writing data to the control module 12. The control module 12 writes the writing data from the channel adapter 11 into the device enclosure 31 via the back end router 21.

In a reading operation of the storage apparatus, the channel adapter 11 receives a reading request from the host, and sends the reading request to the control module 12. The control module 12 reads data for the reading request from the channel adapter 11, out of the device enclosure 31 via the back end router 21, and sends the data to the channel adapter 11. The channel adapter 11 sends the data for the reading request to the host.

Hereinafter, a fault recovery process using the supervisor control unit connected by the Ethernet is described. In the storage apparatus of the present invention, the respective control modules (CMs), the respective device enclosures (DEs), the front end routers (FRTs) and the back end routers (BRTs) are connected with the supervisor control unit via the Ethernet, respectively. Therefore, the control module which has detected a loop anomaly first can issue a LIP as a fault recovery function to a specified loop via the Ethernet. Accordingly, even in a state where the communication is impossible on the fibre channel (FC) between the control module and the back end router (between CM-BRT), it is possible to send a command for issuing the LIP, directly from the control module which prefers to issue the LIP. Accordingly, since it becomes possible to recover from the loop anomaly or discard the command in a short time, and it becomes unnecessary to comprehend states of other control modules, it is possible to make a process simple.

FIG. 2 is an explanatory diagram of a fault recovery process using the supervisor control unit connected by the Ethernet. In FIG. 2, the control modules (CMs) 12, the front end router (FRT) 13, the supervisor control unit (SVC) 17, the back end router (BRT) 21, and the device enclosures (DEs) 31 are provided.

There are four control modules 12 CM#0-CM#3, and the respective control modules are connected with the supervisor control unit 17 by the Ethernet, and the respective control modules are connected with the front end router 13 by an extension PCI as a high speed bus (PCI-Exp), and the respective control modules are further connected with the back end router 21 by a fibre channel interface (FC I/F).

The front end router 13 is connected with the supervisor control unit 17 by the Ethernet, and is connected with the respective control modules 12 by the extension PCI (PCI-Exp). The supervisor control unit (SVC) 17 is connected with the respective control modules 12, the respective device enclosures 31, the front end router 13, and the back end router 21 by the Ethernet, and is a service controller dealing with a supervisory command (a data command from the host is not used). The back end router 21 is connected with the supervisor control unit 17 by the Ethernet, and is connected with the respective control modules 12 and the respective device enclosures 31 by the fibre channel interface (FC I/F).

There are eight device enclosures 31 DE#00-DE#07, and the respective device enclosures have the plurality of HDDs integrated for storing a data. The respective device enclosures are connected with the supervisor control unit 17 by the Ethernet, respectively. The device enclosures 31 DE#00 and DE#01 and the back end router 21 are connected in a loop by the fibre channel interface (FC I/F), the device enclosures 31 DE#02 and DE#03 and the back end router 21 are connected in a loop by the fibre channel interface (FC I/F), the device enclosures 31 DE#04 and DE#05 and the back end router 21 are connected in a loop by the fibre channel interface (FC I/F), and the device enclosures 31 DE#06 and DE#07 and the back end router 21 are connected in a loop by the fibre channel interface (FC I/F).

For example, when the control module 12 #1 detects the loop anomaly of the device enclosures 31 DE#00 and DE#01 and the back end router 21, the control module 12 #1 can specify the loop where the loop anomaly is detected and issue the LIP, via the supervisor control unit 17 connected by the Ethernet. Therefore, even if there is a path anomaly of the control module 12 #1 and the back end router 21 (the communication is impossible therebetween), it is possible to send the command for issuing the LIP, directly from the control module 12 #1 which prefers to issue the LIP.

In this way, by using the Ethernet which is faster than a DEI (device enclosure interface) used conventionally for the connection with the supervisor control unit (SVC) 17, it becomes possible to instruct a fault recovery function (issuing the LIP), which is not possible through the FC, via the Ethernet to the device enclosure 31.

Hereinafter, a flow from a time point when the recovery from the loop anomaly or the discard of the command (for example, reading or writing of the data) is required, to a time point of issuing the LIP, will be described below.

Figure 3:
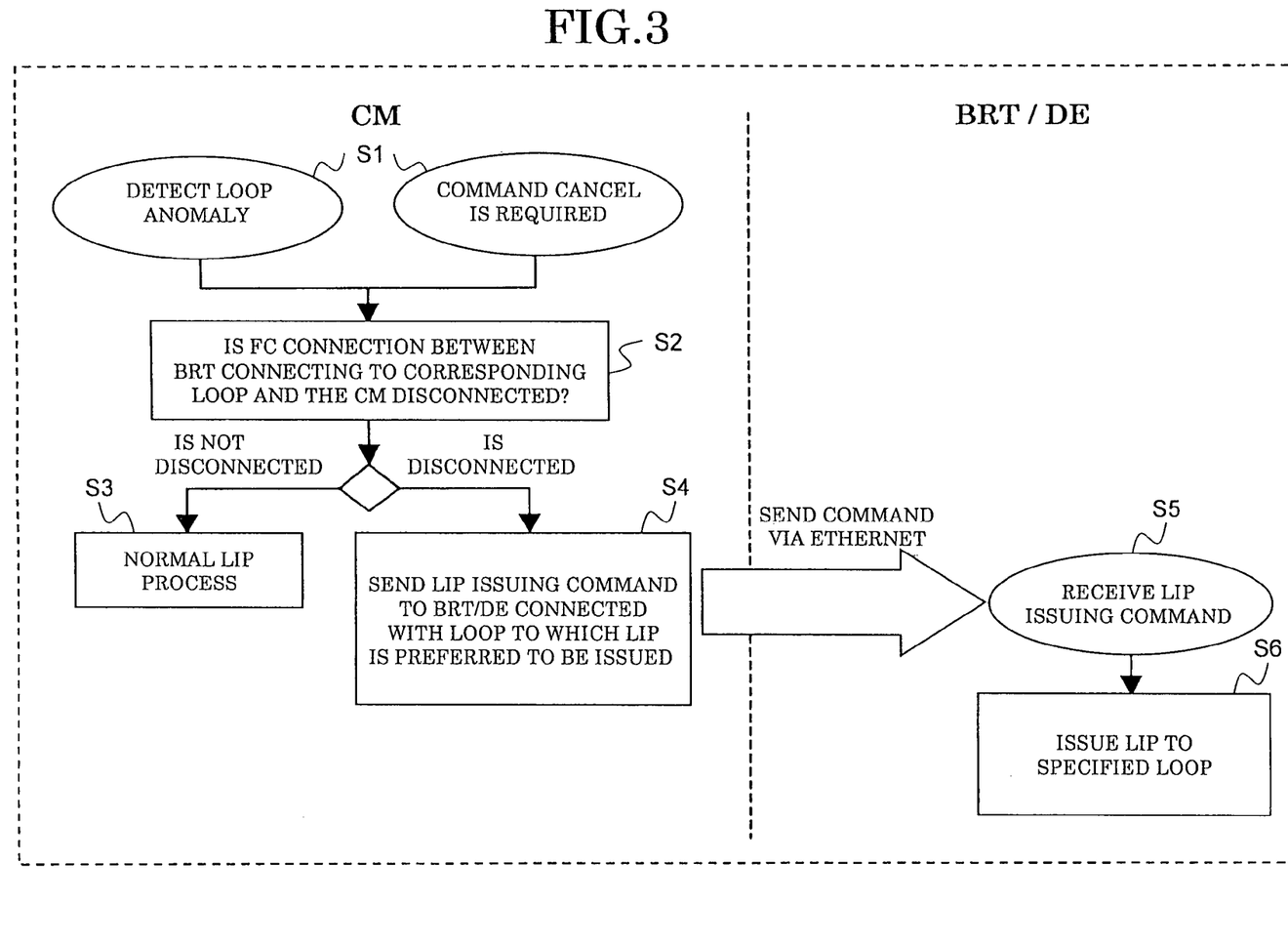
FIG. 3 is a flowchart of LIP issuing process of the present invention.

FIG. 3 is a flowchart of a LIP issuing process. The LIP issuing process will be described according to a process of S1 to S6 shown in FIG. 3.

S1: When the control module 12 detects the loop anomaly or requires to cancel the command, the process proceeds to the process S2.

S2: The control module 12 determines whether or not a FC connection between the back end router (BRT) 21 connecting to the corresponding loop and the control module (CM) 12 is disconnected. When the control module 12 determines that the FC connection between BRT-CM is not disconnected, the process proceeds to the process S3. When the control module 12 determines that the FC connection is disconnected, the process proceeds to the process S4.

S3: The control module 12 performs a normal LIP process with the FC connection between BRT-CM.

S4: The control module 12 sends the LIP issuing command through the supervisor control unit 17 to the back end router (BRT) 21 or the device enclosure (DE) 31 connected with the loop to which the LIP is preferred to be issued via the Ethernet, and the process proceeds to the process S5.

S5: The back end router (BRT) 21 or the device enclosure (DE) 31 receives the LIP issuing command (from the supervisor control unit 17), and the process proceeds to the process S6.

S6: The back end router (BRT) 21 or the device enclosure (DE) 31 issues the LIP to the specified loop (since the BRT has a plurality of loops).

It should be noted that the back end router (BRT) 21 or the device enclosure (DE) 31 has a control unit, respectively, and the control unit performs sending and receiving the information and issuing the LIP.

Moreover, even if the FC connection between the back end router (BRT) 21 connecting to the loop which is anomalous, and the control module 12 which detects the anomaly (between BRT-CM) is not disconnected, it is also possible to issue the LIP via the Ethernet. When the plurality of control modules 12 detect the anomaly of the same loop, instructions for issuing the LIP are sent via the Ethernet simultaneously. When the back end router (BRT) 21 or the device enclosure (DE) 31 receives a plurality of instructions for issuing the LIP simultaneously, it is possible to reduce a number of issuing the LIP which may become a cause of an increase in traffic, by integrating the issuing of the LIP at one time (integrating the LIP issuing process performed by the control unit in the BRT or the DE).

Figure 4:
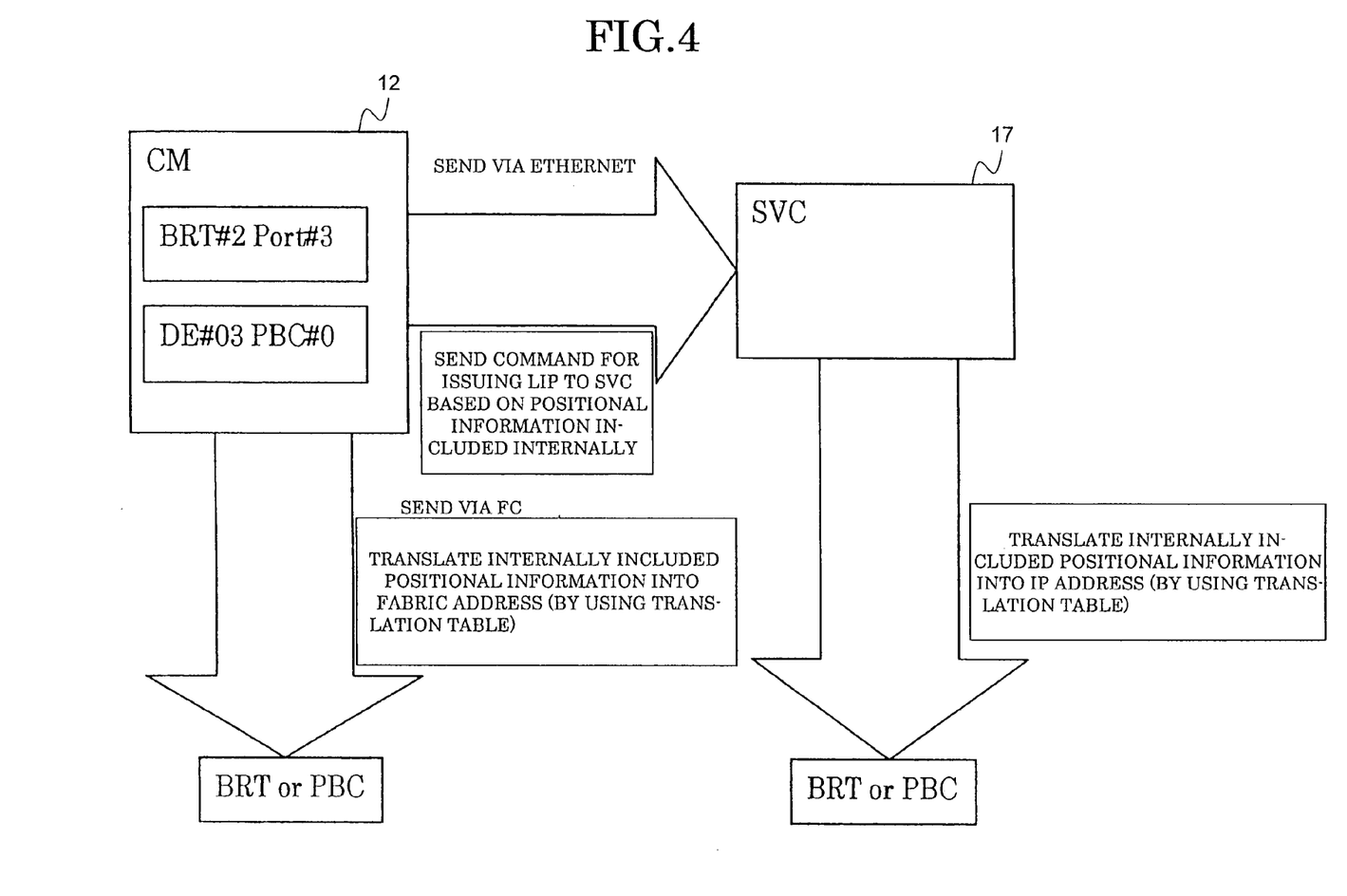
FIG. 4 is an explanatory diagram of translation of a sending destination of the present invention.

Translation of a destination (sending destination) to which the LIP issuing command is sent is described as follows. FIG. 4 is an illustration diagram of translation of the sending destination. In FIG. 4, specification of the sending destination by the control module (CM) 12 is performed with "BRT#2Port#3", "DE#03PBC#0" and so on. "BRT#2Port#3" specifies the back end router #2 as the sending destination, and specifies the port #3 as an object to which the LIP is issued. "DE#03PBC#0" specifies the device enclosure #03 as the sending destination, and specifies a PBC #0 as an object to which the LIP is issued. Here, the PBC is a port bypass circuit, and since there are typically the two loops (port bypass circuits) in the DE (device enclosure), one of the two loops is specified.

The sending of the command for issuing the LIP from the control module (CM) 12 is performed either via the Ethernet or via the FC. When the command is sent via the Ethernet, the command is sent to the supervisor control unit (SVC) 17 based on positional information included internally in the control module 12. The supervisor control unit (SVC) 17 translates the internally included positional information into an IP address which is a general LAN address (by using a translation table), and sends the command to the BRT (back end router) or the PBC. When the command is sent via the FC, the internally included positional information is translated into a fabric address (an address on the FC) (by using the translation table), and sends the command to the BRT (back end router) or the PBC.

Figure 5:
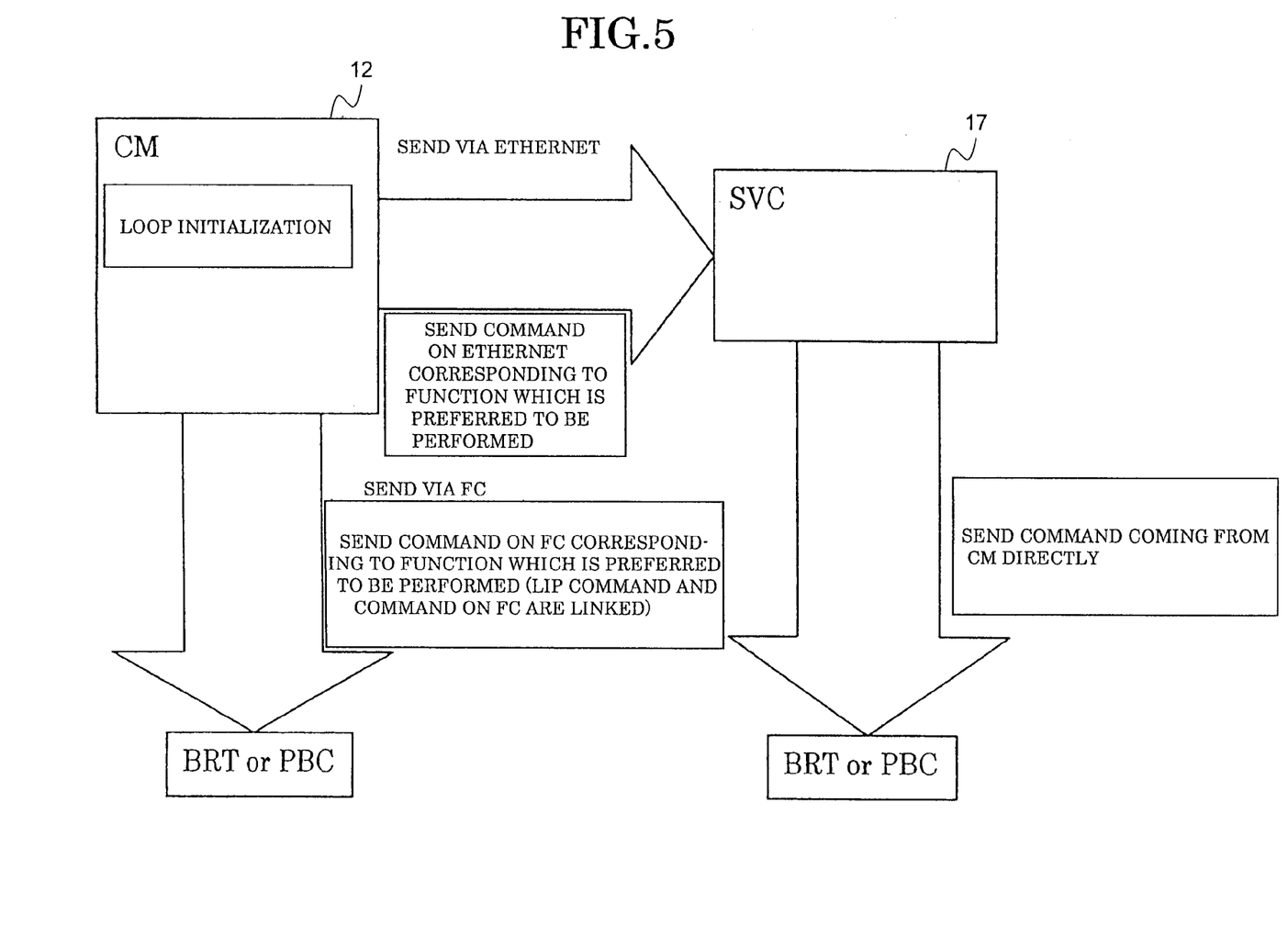
FIG. 5 is an explanatory diagram of translation of a command to be sent of the present invention.

Translation of the command to be sent is described as follows. FIG. 5 is an illustration diagram of translation of the command to be sent. In FIG. 5, a loop initialization (LIP) command from the control module (CM) 12 is sent either via the Ethernet or via the FC, and the LIP command is translated into a command corresponding to each route. When the LIP command is sent via the Ethernet, a command on the Ethernet (a command on the LAN) corresponding to a function which is preferred to be performed, is sent from the control module 12 to the supervisor control unit (SVC) 17. The supervisor control unit (SVC) 17 sends the command coming from the control module 12 directly to the BRT (back end router) or the PBC. When the LIP command is sent via the FC, a command on the FC corresponding to the function which is preferred to be performed is sent to the BRT (back end router) or the PBC (the LIP command and the command on the FC are linked).

Other functions of the storage apparatus of the present invention is described as follows. Furthermore, by performing other functions as follows, which are fundamentally performed via the FC, also via the Ethernet, it becomes possible to further reduce the traffic on the FC.

Obtaining a loop state. That is, it is possible to obtain information on whether or not the loop of the DE is connected, namely, whether or not the loop of the DE is online from the viewpoint of the BRT, and information on a state of a device list of an arbitrated loop as the loop of the DE (AL-PA Map) and so on.

Acquiring disk information, how many disks are connected to each DE (AL-PA as an address of the disk, or WWN as a device specific name and so on) and the like.

A name server function. That is, there is a name server in the BRT and information on how many disks are connected to which port is obtained using the name server.

In this way, by employing the technique of the present invention, it is possible to resolve the loop anomaly rapidly. Since it is not necessary to exchange information on other CMs, it is possible to simplify the process. Even if the loop anomaly has been detected by the plurality of CMs simultaneously, it is possible to reduce the number of issuing the LIP (integrate the same issuing) and suppress the increase in the FC traffic, by performing the issuing of the LIP via the Ethernet. By performing the functions other than the LIP function also via the Ethernet, it is possible to reduce the FC traffic.

What is claimed is:

1. A storage apparatus, comprising:
a plurality of storage devices storing information;
a plurality of first control units each controlling the storage devices;
a first network;
a switching unit connecting between the plurality of storage devices and the plurality of first control units through the first network;
a second network connecting between the plurality of storage devices and the plurality of first control units, and connecting between the plurality of first control units and the switching unit; and
a second control unit connected to the plurality of first control units, the plurality of storage devices and the switching unit through the second network,
wherein the plurality of first control units reads and writes information from the plurality of storage devices and into the plurality of storage devices through the switching unit, and, when a fault occurs for which communication between a storage device and the plurality of first control units is impossible, the plurality of first control units determines whether the first network is disconnected or not, and sends a plurality of fault recovery commands to the storage device or the switching unit through the second network when the first network is disconnected, and
the plurality of fault recovery commands are commands recovering the fault.

2. The storage apparatus according to claim 1, wherein, when the storage device or the switching unit receives a plurality of same fault recovery commands through the second network, the storage device or the switching unit integrates fault recovery processes at one time.

3. The storage apparatus according to claim 2, wherein the plurality of first control units obtains the information on the storage device through the second network.

4. The storage apparatus according to claim 1, wherein the plurality of first control units obtains the information on the storage device through the second network.

5. A method for performing fault recovery of a storage apparatus including a plurality of storage devices storing information, a plurality of first control units each controlling the storage devices, a first network, a switching unit connecting between the plurality of storage devices and the plurality of first control units through the first network, a second network connecting between the plurality of storage devices and:
the plurality of first control units, and connecting between the plurality of first control units and the switching unit, and a second control unit connected to the plurality of first control units, the plurality of storage devices, and the switching unit through the second network, the method comprising:

reading and writing, in the plurality of first control units, information from the plurality of storage devices and into the plurality of storage devices through the switching unit;

determining, when a fault occurs for which communication between a storage device and the plurality of first control units is impossible, in the plurality of first control units, whether the first network is disconnected or not; and sending, when the first network is disconnected, a plurality of fault recovery commands from the plurality of first control units to the storage device or the switching unit through the second network;

wherein the plurality of fault recovery commands are commands recovering the fault.

6. The storage apparatus according to claim 1, wherein the second control unit translates a fault recovery command corresponding to the first network into a command corresponding the second network.

7. A method for performing fault recovery of a storage apparatus, comprising:

storing information in a plurality of storage devices;

controlling the storage devices with a plurality of first control units;

connecting the plurality of storage devices to the plurality of first control units through a first network;

connecting a second network between the plurality of storage devices and the plurality of first control units;

connecting the second network between the plurality of first control units and the switching unit;

connecting a second control unit to the plurality of first control units, the plurality of storage devices, and the switching unit through the second network;

reading the information from the plurality of storage devices in the plurality of first control units;

writing to the plurality of storage devices in the plurality of first control units;

determining, in the plurality of first control units, whether the first network is disconnected if a fault occurs for which communication between a storage device and the plurality of first control units is impossible; and sending a plurality of fault recovery commands from the plurality of first control units to the storage device or the switching unit through the second network if the first network is disconnected;

wherein the plurality of fault recovery commands are commands recovering the fault.

* * * * *

UNITED STATES PATENT AND TRADEMARK OFFICE
CERTIFICATE OF CORRECTION

| | | |
|---|---|---|
| PATENT NO. | : 7,797,567 B2 | Page 1 of 1 |
| APPLICATION NO. | : 11/508913 | |
| DATED | : September 14, 2010 | |
| INVENTOR(S) | : Atsuhiro Otaka et al. | |

It is certified that error appears in the above-identified patent and that said Letters Patent is hereby corrected as shown below:

Column 8, line 61, in claim 5, delete "and:" and insert -- and --, therefor.

Signed and Sealed this
Twelfth Day of April, 2011

David J. Kappos
*Director of the United States Patent and Trademark Office*